United States Patent
Bendak et al.

(10) Patent No.: US 7,023,881 B1
(45) Date of Patent: Apr. 4, 2006

(54) SYSTEM AND METHOD FOR SELECTIVELY SCRAMBLING MULTIDIMENSIONAL DIGITAL FRAME STRUCTURE COMMUNICATIONS

(75) Inventors: George Beshara Bendak, San Diego, CA (US); Alan Michael Sorgi, San Diego, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 828 days.

(21) Appl. No.: 09/747,124

(22) Filed: Dec. 22, 2000

(51) Int. Cl.
  *H04J 3/22* (2006.01)
  *H04J 3/06* (2006.01)
  *H04N 7/167* (2006.01)
  *H04N 7/173* (2006.01)

(52) U.S. Cl. ............... 370/470; 370/509; 380/210; 725/106

(58) Field of Classification Search ......... 370/466, 370/474, 470; 380/239, 210; 705/51; 375/145; 713/189; 725/106
See application file for complete search history.

(56) References Cited

U.S. PATENT DOCUMENTS

| | | | |
|---|---|---|---|
| 4,606,042 A * | 8/1986 | Kahn et al. ............... 380/37 |
| 4,710,921 A * | 12/1987 | Ishidoh et al. ............ 370/522 |
| 4,771,463 A * | 9/1988 | Beeman ................... 380/46 |
| 4,953,211 A * | 8/1990 | Repton et al. ............ 380/261 |
| 5,029,207 A * | 7/1991 | Gammie ................... 380/228 |
| 5,251,205 A | 10/1993 | Callon et al. |
| 5,319,707 A * | 6/1994 | Wasilewski et al. ....... 380/212 |
| 5,490,252 A | 2/1996 | Macera et al. |
| 5,568,471 A | 10/1996 | Hershey et al. |
| 5,608,734 A * | 3/1997 | Sandler et al. ............ 370/509 |
| 5,661,763 A | 8/1997 | Sands |
| 5,666,108 A | 9/1997 | Duffy |
| 5,777,992 A * | 7/1998 | Lokhoff .................. 370/389 |
| 5,778,000 A | 7/1998 | Dosiere et al. |
| 5,787,171 A * | 7/1998 | Kubota et al. ............ 380/239 |
| 5,787,180 A * | 7/1998 | Hall et al. ................ 380/52 |
| 5,793,976 A | 8/1998 | Chen et al. |
| 5,835,602 A * | 11/1998 | Lang ..................... 380/268 |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |
| 6,061,451 A * | 5/2000 | Muratani et al. .......... 380/201 |
| 6,584,199 B1 * | 6/2003 | Kim et al. ............... 380/203 |
| 6,836,485 B1 * | 12/2004 | Bendak et al. ............ 370/509 |
| 6,847,657 B1 * | 1/2005 | Bendak et al. ............ 370/509 |
| 6,912,261 B1 * | 6/2005 | Aslanis et al. ............ 375/364 |
| 2002/0057713 A1 * | 5/2002 | Bagchi et al. ............ 370/468 |

* cited by examiner

*Primary Examiner*—John Pezzlo
*Assistant Examiner*—Hong Sol Cho
(74) *Attorney, Agent, or Firm*—INCAPLAW; Terrance A. Meador (57) ABSTRACT

A system and method have been provided to increase security in scrambled communications by periodically changing the seed masks used to generate the scrambling algorithms at the transmitter and receiver. The scrambling algorithm is changed by periodically modifying the seed masks which establishes the initial state of the scrambling algorithm generators. The same seed mask key is passed through an auxiliary communication channel to the receiver to insure that matching descrambling algorithms are generated.

32 Claims, 6 Drawing Sheets

SYSTEM AND METHOD FOR SELECTIVELY SCRAMBLING MULTIDIMENSIONAL DIGITAL FRAME STRUCTURE COMMUNICATIONS

BACKGROUND OF THE INVENTION

1. Field of the Invention

This invention relates generally to the communication of data in a multidimensional digital frame structure and, more particularly, to a system and method of selectively scrambling the framed communications as a means of segmenting nodes in a network of connected communication nodes.

2. Description of the Related Art

Non-return-to-zero (NRZ) encoded transmission systems are typically designed so the timing reference clock at the receiver is recovered solely from transitions in the received data signal. Information is reliably communicated over such systems if the transition density of the transmitted data sequence is sufficiently high. If the data sequence transition density is not adequate, the recovered timing reference clock in the receiver will not track the transmitter timing reference accurately enough to receive the data sequence error free. When the transition density is too low, the receiver timing reference becomes "unlocked" with respect to the transmitter timing reference, and communication between the transmitter and receiver is lost or degraded.

In order to ensure that adequate data transition density exists, many NRZ encoded transmission systems rely on scrambling to randomize the data prior to transmission. The SONET format, as described in GR-253-CORE "Synchronous Optical Network Transport Systems: Common Generic Criteria", Revision 1, December 1997, Bellcore, is an example of such a system. The frame synchronous SONET scrambler described in the above publication works well for Time Division Multiplexed (TDM) based payload mappings that interleave data from multiple sources into a single SONET frame. For payload mappings that accept data from a single source, the SONET frame synchronous scrambler may not be adequate. The SONET format suffers from two liabilities: 1) it is reset to the same value at the beginning of each SONET frame; and, more importantly, 2) the length of the sequence before repeating is only 127 bits.

Publication RFC-1619, "PPP over SONET/SDH", Issue 1, May 1994, Internet Engineering Task Force, defines a direct mapping of the HDLC (high-level Data link control) encapsulated packet based point-to-point protocol (PPP) into the SONET payload. As is noted in "Self-Synchronous Packet Scrambler", U.S. Pat. No. 5,835,602, invented by S. Lang, a malicious user may generate packets consisting of the SONET frame synchronous scrambler sequence. If such packets are transported using the mapping defined in RFC-1619, there is a non-trivial probability that the packet sequence will be aligned with the frame-synchronous SONET scrambler resulting in long sequences of ones or zeros that could disrupt the receive clock recovery circuit.

U.S. Pat. No. 5,835,602 describes a method of reducing the probability of the above-described disruption, which involves adding a self-synchronizing scrambler after the HDLC (protocol for X.25 packet switching networks) packet generation, but before the SONET frame generator. This provides protection as long as the malicious user has no knowledge of the state of the self-synchronizing scrambler. However, a user may have knowledge of the scrambler state at the start of transmission. The self-synchronizing scrambler is usually initialized to a pre-defined state (such as all ones). Then, if only HDLC idle flags are passed through the scrambler until the packet transmission is initiated, the self-synchronizing scrambler will be in one of a small number of states when packet transmission begins. Thus, a malicious user could still disrupt transmission with a non-trivial probability of success.

This security problem could be solved if the scrambling algorithms could be constantly modified, so that a non-authorized user could not know the scrambling state. However, the scrambling seeds for these scramblers are not normally programmable. There is no standard practice with respect to the programmability and reloadability of the scrambling seeds for the purpose of providing secure data in a variable rate interleaved multi-frame digital wrapper system using forward error correction (FEC).

It would be advantageous if framed digital communications could be transmitted with greater security from intentional disruption.

It would be advantageous if framed digital communications could be selectively communicated to nodes in a network of nodes.

It would be advantageous if communications could be selectively scrambled with constantly changing scrambling algorithms.

It would be advantageous if the seed masks used to generate scrambling algorithms for transmitted communications could be periodically changed. Likewise it would be advantageous if the communications could be received and descrambled using the same seed masks.

SUMMARY OF THE INVENTION

Accordingly, this invention provides a scrambling structure with a programmable and reloadable seed to generate proper data transition densities, and to provide network security by essentially encrypting the data.

More specifically, the system comprises a transmitter with a scrambling algorithm generator to accept a seed mask and supply a scrambling algorithm responsive to the structure of the algorithm generator and the seed mask. A transmit seed mask generator accepts seed selection commands selectively supplies seeds to the scrambling algorithm generator. A scrambler accepts communications from the scrambling algorithm generator and supplies communications scrambled with the scrambling algorithm responsive to the selected seed mask.

Likewise, a receiver includes a descrambling algorithm generator to accept a seed mask and to supply a descrambling algorithm responsive to the structure of the algorithm generator and the seed mask. A receiver seed mask generator accepts seed selection commands and selectively supplies seed masks. A descrambler accepts scrambled communications and the descrambling algorithm, and supplies communications descrambled with the descrambling algorithm responsive to the selected seed mask. The seed selection commands are passed to the receiver seed generator through an auxiliary communications channels, such as unscrambled frame synchronization bytes. Other aspects of the system, and a method for selectively scrambling communications are presented below in greater detail.

DETAILED DESCRIPTION OF THE PREFERRED EMBODIMENTS

Figure 1:
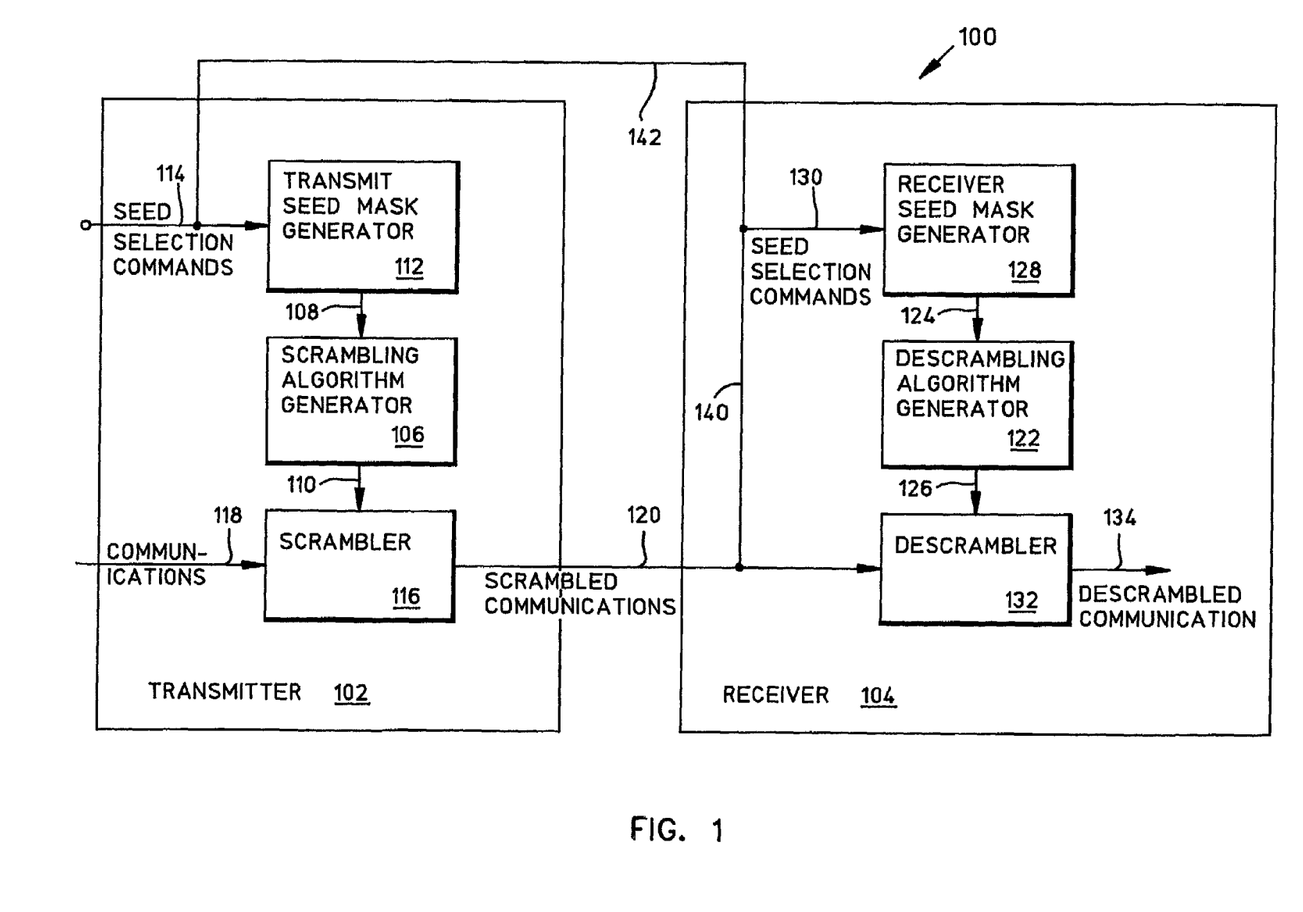
FIG. 1 is a schematic block diagram of a system for programmably scrambling a multidimensional digital frame structure.

FIG. 1 is a schematic block diagram of a system for programmably scrambling a multidimensional digital frame structure. The system 100 comprises a transmitter 102 and a receiver 104. It should be understood, however, that the transmitter 102 may be communicating with a plurality of receivers, or nodes, either serially or in parallel, although only a single receiver 104 is shown. The transmitter 102 includes a scrambling algorithm generator 106 having an input on line 108 to accept a seed mask and an output to supply a scrambling algorithm responsive to the structure of the algorithm generator and the seed mask, online 110.

A transmit seed mask generator 112 has an input on line 114 to accept seed selection commands and an output connected to the scrambling algorithm generator input on line 108 to selectively supply seed masks. A scrambler 116 has a first input on line 118 to accept communications and a second input connected to the scrambling algorithm generator output on line 110. The scrambler 116 has an output on line 120 to supply communications scrambled with a scrambling algorithm responsive to the selected seed mask.

The receiver 104 includes a descrambling algorithm generator 122 having an input on line 124 to accept a seed mask and an output on line 126 to supply a descrambling algorithm responsive to the structure of the algorithm generator and the seed mask. A receiver seed mask generator 128 has an input on line 130 to accept seed selection commands and an output connected to the descrambling algorithm generator input on line 124 to selectively supply seed masks.

A descrambler 132 has a first input to accept scrambled communications on line 120 and a second input connected to the descrambling algorithm generator output on line 126. The descrambler 132 has an output on line 134 to supply communications descrambled with a descrambling algorithm responsive to the selected seed mask.

The system 100 achieves additional security and receiver (node) segmentation as the transmit seed mask generator 112 periodically receives commands to change the seed mask. Likewise, the receiver seed mask generator must use the same seed masks to descramble communications.

Figure 2:
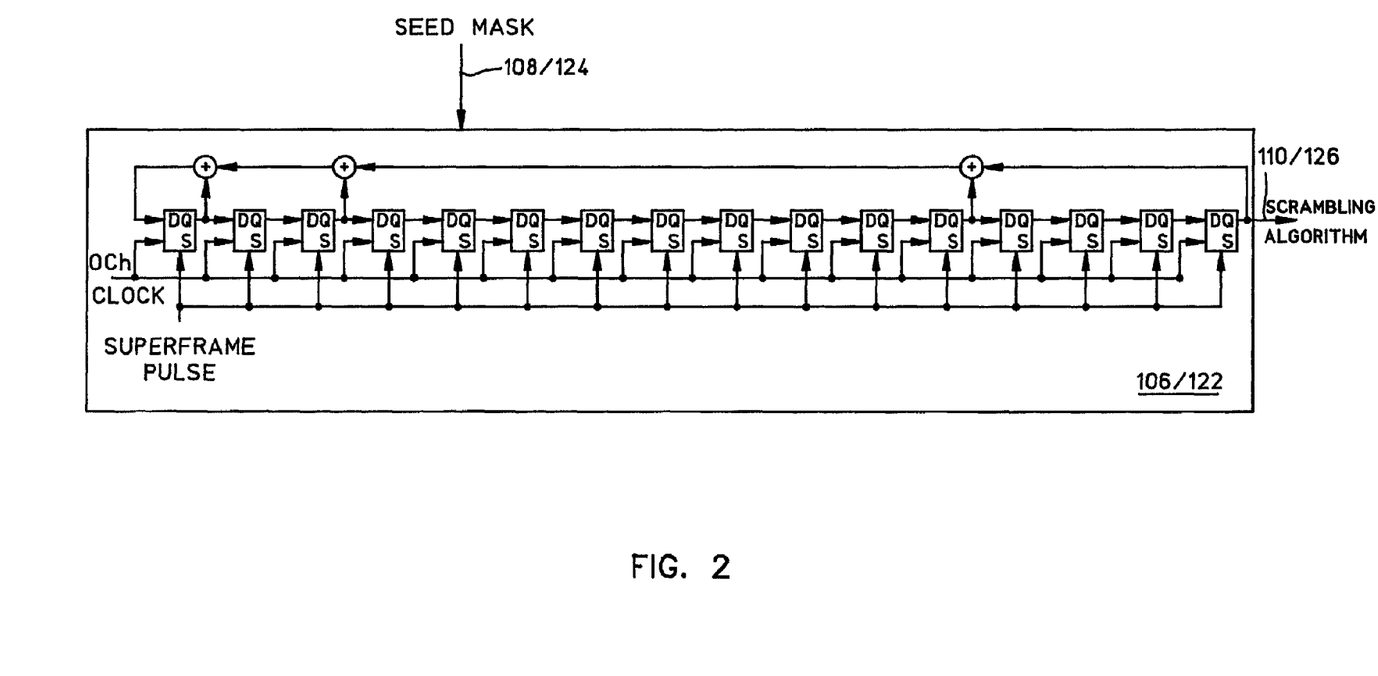
FIG. 2 is a schematic block diagram illustrating either the scrambling algorithm generator or the descrambling algorithm generator.

FIG. 2 is a schematic block diagram illustrating either the scrambling algorithm generator 106 or the descrambling algorithm generator 122. The algorithm structure shown using sixteen stages or registers. Specifically, the algorithm structure is $1+x+x^3+x^{12}+x^{16}$, however, the present invention is not limited to any particular number of registers or any particular algorithm structure, as long as the transmitter 102 and receiver 104 use the same structure. The algorithm structure is defined herein as the specific arrangement of AND gates in the feedback loop. There are a large variety of structures that would be suitable for the present invention. In some aspects of the invention not shown, the seed remains constant while the algorithm structure is selectable to supply a plurality of selectable (de)scrambling algorithms.

The algorithm generator 106/122 is reloaded, the registers are initialized, with a seed mask once every superframe. As is well known, the generator supplies an algorithm or code that is a product of the generator structure and the seed mask. One scrambling algorithm bit is produced every clock cycle, and a new seed mask is loaded into the registers every superframe, assuming the scrambling algorithm is changed every superframe. The scrambling code is combined with the communication, typically bit-for-bit, to produce the scrambled communication. Likewise, the descrambling algorithm is combined with the scrambled communication to produce the descrambled communication.

Since the example algorithm generator 106/122 uses a sixteen stage algorithm structure, the seed mask is 16-bits. The seed mask can be programmed through a register, as shown in Table 1, and provided on lines 114/130 as seed mask selection commands.

TABLE 1

Scrambling/Descrambling Seed Mask

| | Bit | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Name | | | | | | | | Seed Mask | | | | | | | | |
| Mode | rw | rw | rw | rw | rw | rw | rw | rw | rw | rw | rw | rw | rw | rw | rw | rw |
| Default | 1 | 1 | 1 | 1 | 1 | 1 | 1 | 1 | 1 | 1 | 1 | 1 | 1 | 1 | 1 | 1 |

| Bit Positions | Function | Description |
|---|---|---|
| 15:0 | Seed Mask | This is the seed for the algorithm generator. (Default all 1s) |

Returning to FIG. 1, the seed mask generators 112/128 can reload the algorithm generator 106/122 with a seed mask generated by a randomization algorithm, or using a security key that could be transported in one of the programmable overhead bytes. Since the scrambling seed, and hence the scrambling algorithm can be changing as often as once per superframe, it is nearly impossible for the transmissions to be decoded.

Figure 3:
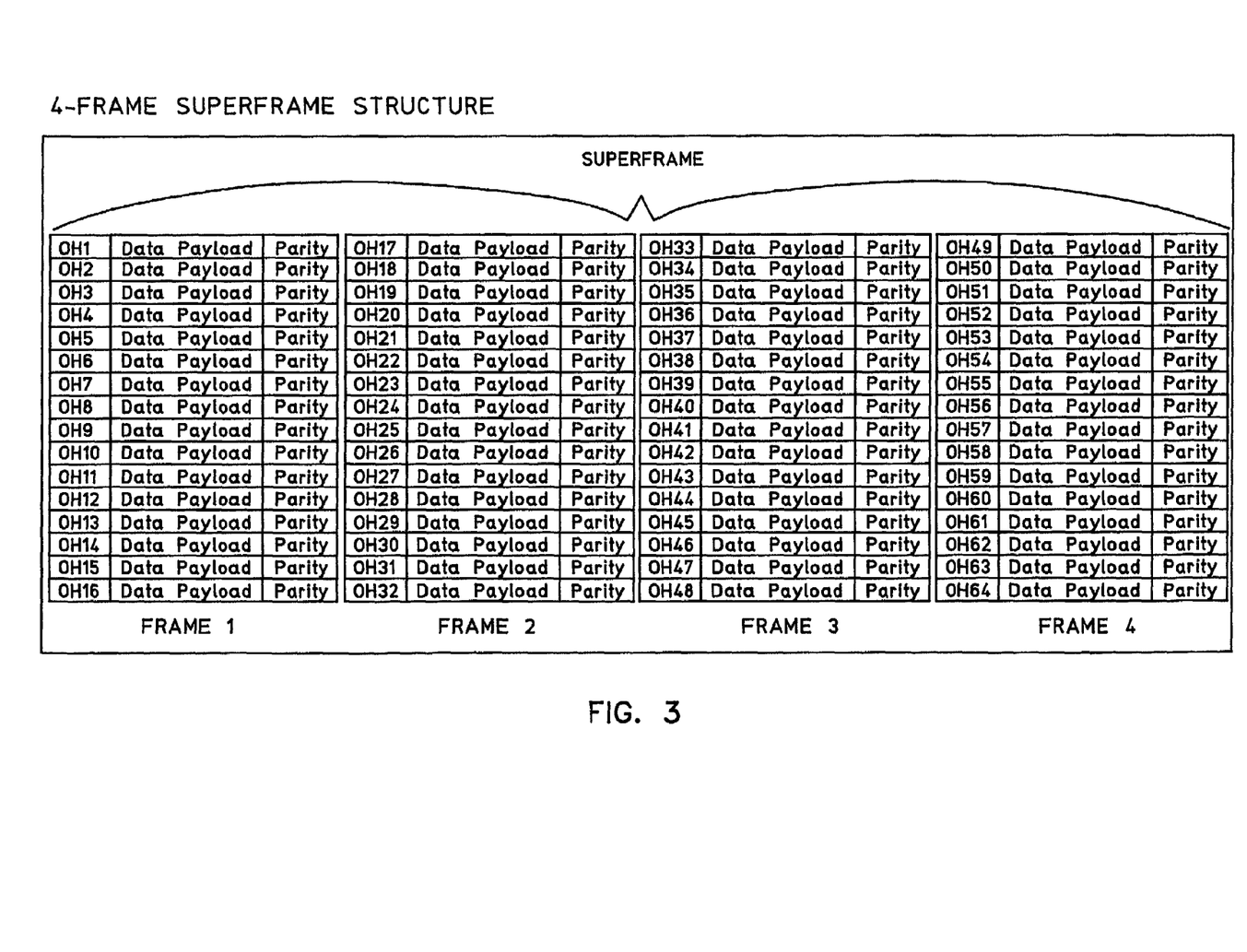
FIG. 3 is a drawing illustrating a superframe structure in which the scrambled communications are embedded.

FIG. 3 is a drawing illustrating a superframe structure in which the scrambled communications are embedded. Each superframe includes a first plurality of frames, a four frame example is shown. Each frame includes sixteen sub-frames or rows. Each row includes overhead (OH), payload, and FEC sections. The overhead section typically includes frame synchronization bytes that enable the receiver to synchronize scrambled communications to a descrambling algorithm.

In some aspects of the invention, the scrambler 116 accepts communications formatted in superframes, with each superframe including a first plurality of frames. The transmit seed generator 112 selects a seed mask every superframe, and the scrambling algorithm generator 106 changes the scrambling algorithm every superframe. The receiver 104 performs a similar process to recover the communication. That is, the descrambler 132 receives scrambled communication formatted into superframes, and the receiver seed generator 128 accepts commands to generate a new seed mask every superframe.

In some aspects of the invention, the scrambler 116 accepts communications formatted in superframes, with each superframe including frame synchronization bytes (FSBs). The scrambler 116 synchronously scrambles the communications in each superframe in response to the superframe frame synchronization bytes. Likewise, the receiver 104 uses the FSBs for synchronization in the descrambling process.

For example, the transmit seed generator 112 accepts commands to generate a first seed mask on line 114, and the scrambling algorithm generator 106 generates a first algorithm in response to receiving the first seed mask. The scrambler 116 scrambles communications using the first algorithm. Then, the receiver seed generator 128 accepts commands on line 130 to generate a first seed mask. The descrambling algorithm generator 122 generates a first algorithm in response to receiving the first seed mask, and the descrambler 132 descrambles communications using the first algorithm.

Of particular interest is the manner in which the receiver seed generator 128 receives the seed mask selection commands. The receiver 104 accepts seed mask information in an auxiliary channel and supplies seed mask commands to the receiver seed mask generator 128 in response to the seed mask information. The receiver seed mask generator 128 generates a first seed mask in response to the received seed mask information, the descrambling algorithm generator 122 generates a first algorithm in response to the first seed mask, and the descrambler 132 descrambles the communications in response to the first algorithm.

In some aspects of the invention, the receiver receives seed mask information in an auxiliary channel, such as unscrambled overhead bytes in the scrambled communication superframe. The overhead bytes are shown being passed to the receiver seed mask generator on line 140. In some aspects of the invention, the receiver seed generator 128 generates the first seed mask in response to the receipt of the unscrambled overhead bytes. Alternately, the receiver seed generator 128 retrieves a seed mask from storage in response to the receipt of the unscrambled overhead bytes. In some aspects the auxiliary channel is formed from unscrambled frame synchronization bytes received in the otherwise scrambled communication superframe.

In another aspect of the invention, the receiver accepts scrambled communications through a first data link on line 120 and the auxiliary channel through a second data link on line 142, independent of the first data link on line 120. The seed mask can be delivered on line 142. Alternately, a key for retrieving the seed mask from storage, or generating the seed mask can be delivered via line 142.

Figure 4:
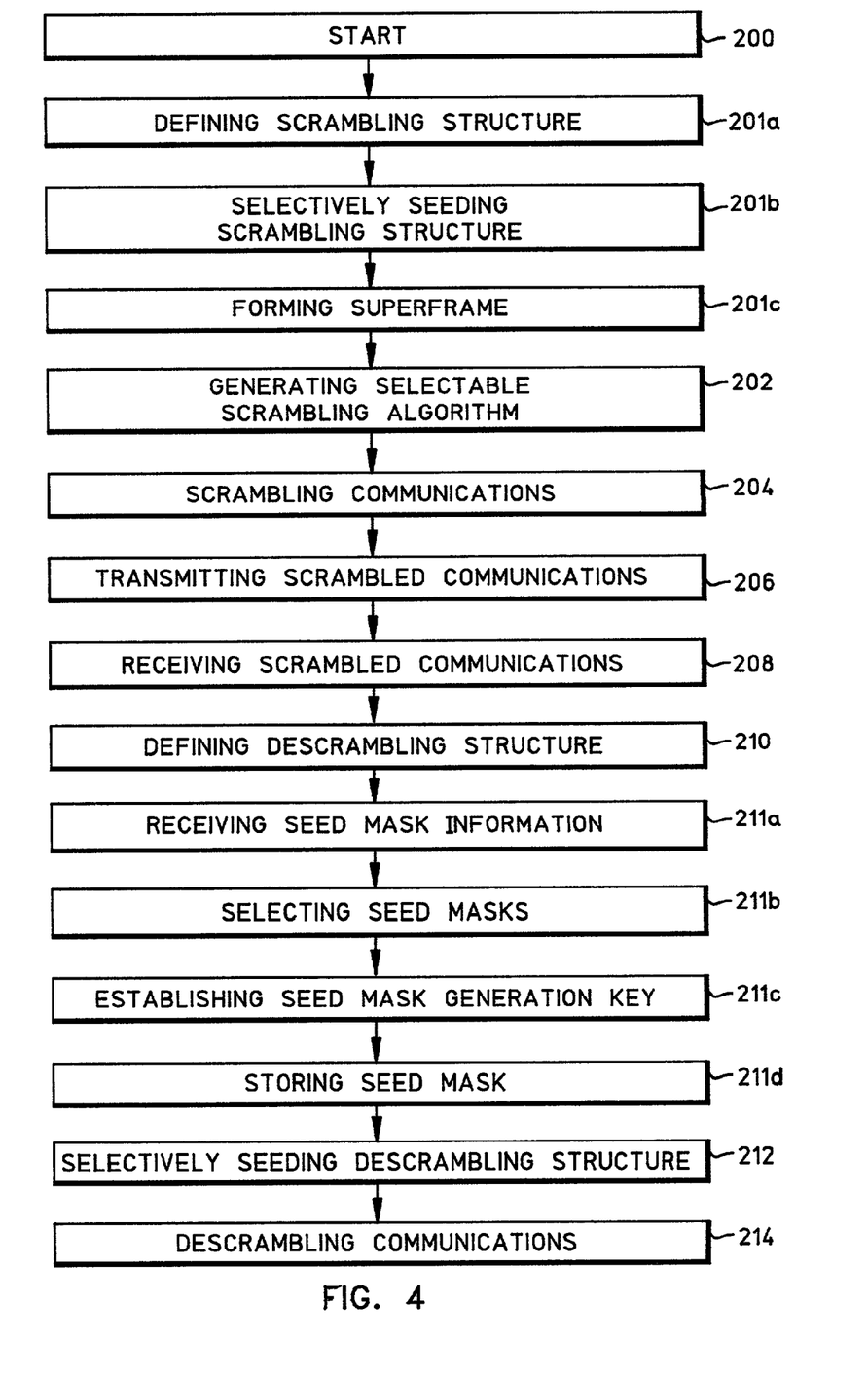
FIG. 4 is a flowchart depicting a method for programmably scrambling a multidimensional digital frame structure.

FIG. 4 is a flowchart depicting a method for programmably scrambling a multidimensional digital frame structure. Although the method is depicted as a sequence of numbered steps for clarity, no order should be inferred from the numbering unless explicitly stated. The method begins with Step 200. Step 202 generates a selectable scrambling algorithm. Step 204 scrambles communications using the selectable scrambling algorithm. Step 201a defines a scrambling structure. Step 201b selectively seeds the scrambling structure. Generating a selectable scrambling algorithm in Step 202 includes generating a selectable scrambling algorithm from the selectively seeded scrambling structure.

In some aspects of the invention, selectively seeding the scrambling structure in Step 201b includes selectively initializing the scrambling structure with a seed mask.

Step 201c forms superframes from a first plurality of frames. Selectively seeding the scrambling structure in Step 201b includes selecting a seed mask every superframe.

In some aspects of the invention, selectively seeding the scrambling structure in Step 201b includes selecting a seed mask from a second plurality of seed masks. Scrambling communications using the selectable scrambling algorithm in Step 204 includes scrambling the communications with a second plurality of scrambling algorithms.

In some aspects of the invention, defining a scrambling structure in Step 201a includes defining a scrambling structure with a third plurality of steps. Selectively seeding the scrambling structure in Step 201b includes forming seed masks including a third plurality of bits. In some aspects of the invention, the third plurality equals sixteen.

In some aspects, forming superframes from a first plurality of frames in Step 201c includes forming superframes having frame synchronization bytes. Scrambling communications using a selectable scrambling algorithm in Step 204 includes synchronously scrambling the communications in each superframe in response to the superframe frame synchronization bytes.

In some aspects of the invention, selectively seeding the scrambling structure in Step 201b includes generating seed masks in response to a predetermined seed mask selection algorithm.

In some aspects, Step 206 transmits the scrambled communications. Step 208 receives the scrambled and transmitted communications. Step 210 defines a descrambling structure. Step 212 selectively seeds the descrambling structure. Step 214 descrambles communications using a descrambling algorithm responsive to the selectively seeded descrambling structure.

In some aspects of the invention, selectively seeding the scrambling structure in Step 201b includes seeding the scrambling structure with a first seed mask. Selectively seeding the descrambling structure in Step 212 includes seeding the descrambling structure with the first seed mask.

Step 211a receives seed mask information in an auxiliary channel. Step 211b selects seed masks in response to the receiving seed mask information. Selectively seeding the descrambling structure in Step 212 includes seeding the descrambling structure with the seed masks selected in response to the seed mask information.

In some aspects, receiving seed mask information in an auxiliary channel in Step 211a includes receiving unscrambled overhead bytes. In some aspects, receiving seed mask information in an auxiliary channel in Step 211a includes receiving unscrambled frame synchronization bytes. Selecting seed masks in response to the receiving seed mask information in Step 211b includes selecting seed masks in response to receiving the unscrambled overhead bytes.

Step 211c establishes a seed mask generation key. Selecting seed masks in response to the receiving seed mask information in Step 211*b* includes using the unscrambled overhead bytes as a key to generate the seed masks.

Step 211*d* stores seed masks. Selecting seed masks in response to receiving the unscrambled overhead bytes in Step 211*b* includes using the unscrambled overhead bytes as a key to retrieve the seed masks.

In some aspects, the scrambled communications are received in Step 208 through a first data link. Receiving seed mask information in an auxiliary channel in Step 211*a* includes receiving seed mask information through a second data link.

In some aspects, receiving scrambled communications in Step 208 includes receiving scrambled communication superframes. Selectively seeding the descrambling structure in Step 212 includes selecting a seed mask every superframe.

Figure 5:
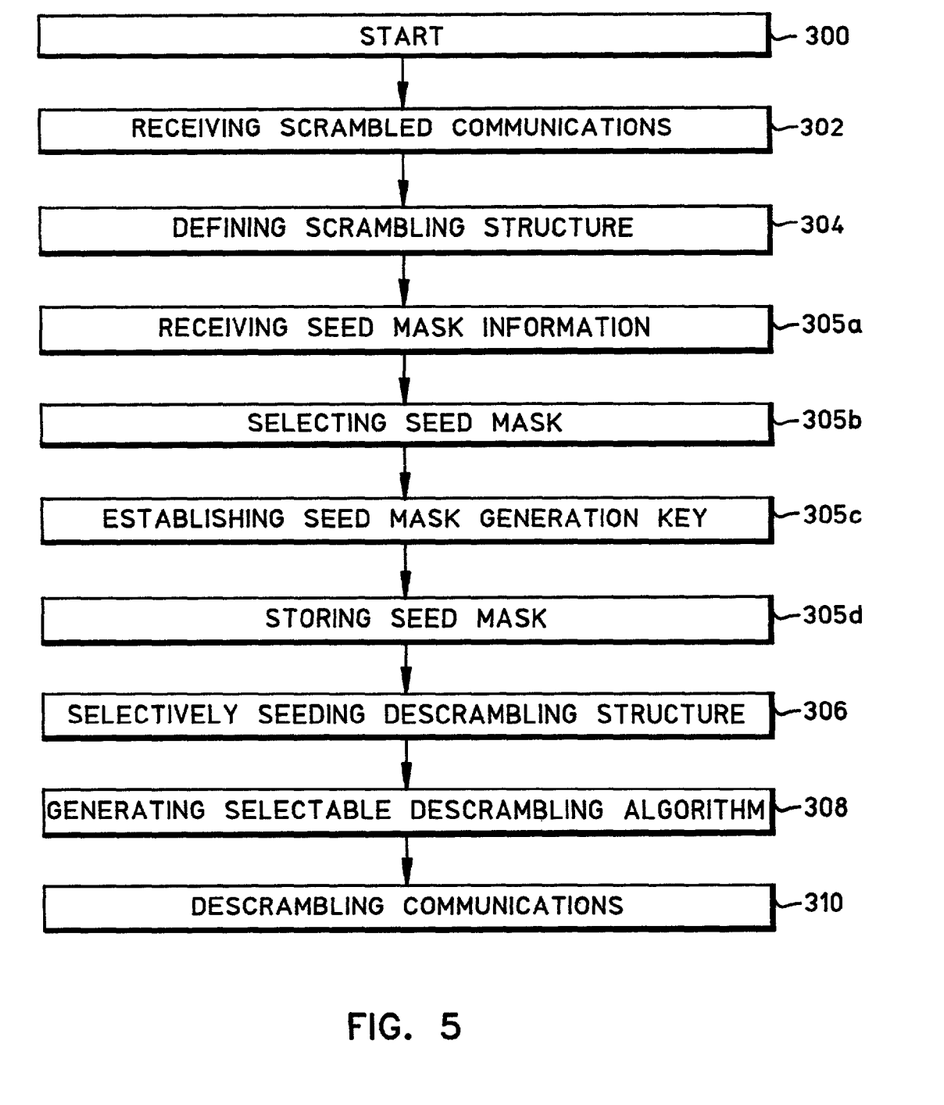
FIG. 5 is a flowchart depicting a method for programmably descrambling a multidimensional digital frame structure.

FIG. 5 is a flowchart depicting a method for programmably descrambling a multidimensional digital frame structure. The method begins with Step 300. Step 302 receives scrambled communications. Step 304 defines a descrambling structure. Step 306 selectively seeds the descrambling structure. Step 308 generates a selectable descrambling algorithm responsive to the selective seeding of the descrambling structure. Step 310 descrambles the communications using the selectable descrambling algorithm.

In some aspects of the invention, selectively seeding the descrambling structure in Step 306 includes periodically changing the descrambling structure seed mask.

In some aspects, receiving scrambled communications in Step 302 includes receiving scrambled communication superframes. Selectively seeding the descrambling structure in Step 306 includes selecting a seed mask every superframe.

In some aspects, receiving scrambled communications in Step 302 includes receiving scrambled communication superframes, with each superframe including frame synchronization bytes. Descrambling communications using a selectable descrambling algorithm in Step 310 includes synchronously descrambling the communications in each superframe in response to the superframe frame synchronization bytes.

Step 305*a* receives seed mask information in an auxiliary channel. Step 305*b* selects seed masks in response to receiving seed mask information. Selectively seeding the descrambling structure in Step 306 includes seeding the descrambling structure with the selected seed masks.

In some aspects, receiving seed mask information in an auxiliary channel in Step 305*a* includes receiving unscrambled overhead bytes. Selecting seed masks in response to the receiving seed mask information in Step 305*b* includes selecting seed masks in response to receiving the unscrambled overhead bytes.

Step 305*c* establishes a seed mask generation key. Selecting seed masks in response to the receiving seed mask information in Step 305*b* includes using the unscrambled overhead bytes as a key to generate the seed masks.

Step 305*d* stores seed masks. Selecting seed masks in response to receiving the unscrambled overhead bytes in Step 305*b* includes using the unscrambled overhead bytes as a key to retrieve the seed masks.

Figure 6:
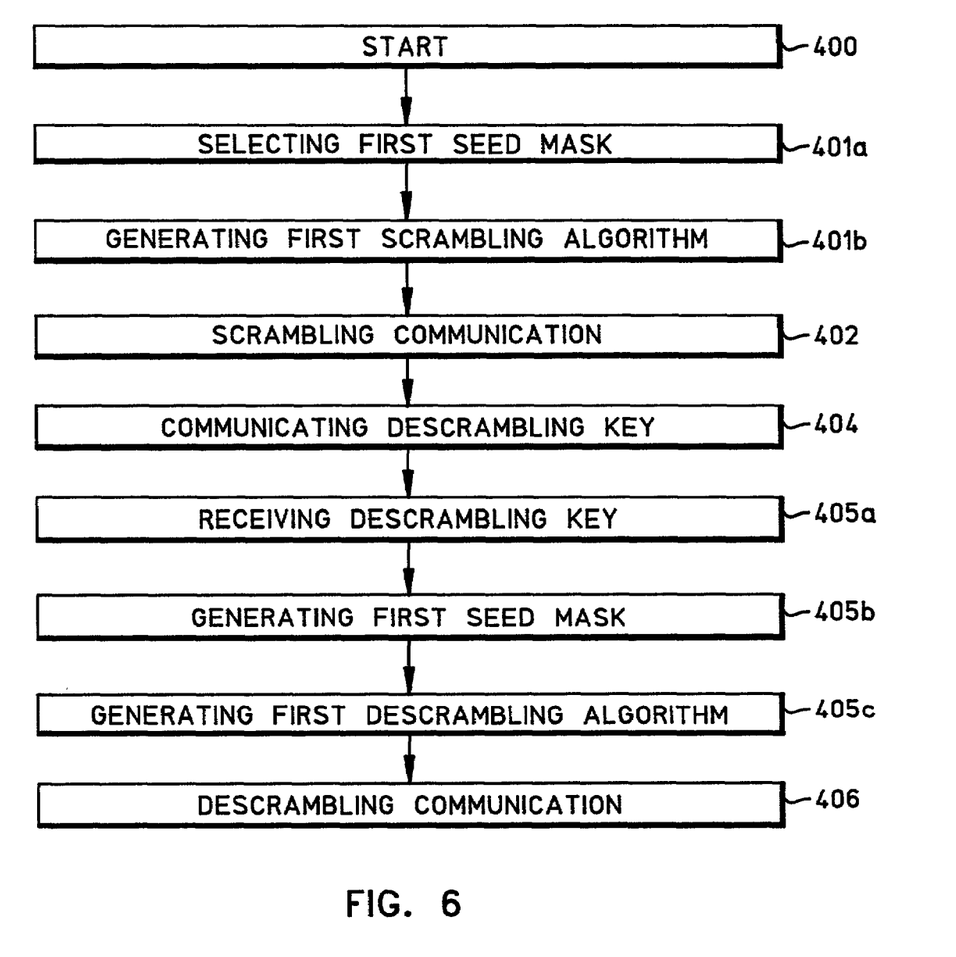
FIG. 6 is a flowchart depicting a method for segmenting nodes in a network of communication nodes in a multidimensional digital frame structure.

FIG. 6 is a flowchart depicting a method for segmenting nodes in a network of communication nodes in a multidimensional digital frame structure. The method begins with Step 400. Step 402 scrambles a communication. Step 404 communicates the descrambling key to selected nodes in the network. Step 406 descrambles the communication at the selected nodes, in response to receiving the descrambling key.

Step 401*a* selects a first seed mask. Step 401*b* generates a first scrambling algorithm from the first seed mask. Scrambling a communication in Step 402 includes scrambling the communication using the first scrambling algorithm.

In some aspects, Step 405*a* receives the descrambling key at the selected nodes. Step 405*b* in response to receiving the descrambling key, generates the first seed mask. Step 405*c* generates a first descrambling algorithm from the first seed mask. Descrambling the communication at the selected nodes in response to receiving the descrambling key in Step 406 includes descrambling the communication using the first descrambling algorithm.

A system and method have been provided which add an additional layer of security to scrambled communications. The advantage of this invention is that it allows the scrambler, that is normally used to provide a high data transition density in the transmitted data, to also be used for data encryption. An example of the invention is provided with a programmable scrambling seed to be reprogrammable during normal operation and loaded once every superframe. However, other variations and embodiments will occur to those skilled in the art.

We claim:

1. A method for scrambling communications formatted in a digital frame structure, comprising:

forming superframes from a first plurality of frames;

defining a scrambling structure;

selectively seeding the scrambling structure;

wherein selectively seeding the scrambling structure includes selectively initializing the scrambling structure with a seed mask;

wherein selectively seeding the scrambling structure further includes selecting a seed mask every superframe; and wherein selectively seeding the scrambling structure further includes selecting a seed mask from a second plurality of seed masks;

generating a selectable scrambling algorithm from the selectively seeded scrambling structure; and scrambling communications in a frame using the selectable scrambling algorithm;

wherein scrambling communications using the selectable scrambling algorithm includes scrambling the communications with a second plurality of scrambling algorithms.

2. The method of claim 1 wherein defining a scrambling structure includes defining a scrambling structure with a third plurality of steps; and wherein selectively seeding the scrambling structure includes forming seed masks including a third plurality of bits.

3. The method of claim 2 wherein forming superframes from a first plurality of frames includes forming superframes having frame synchronization bytes; and wherein scrambling communications using a selectable scrambling algorithm includes synchronously scrambling the communications in each superframe in response to the superframe frame synchronization bytes.

4. The method of claim 2 in which the third plurality equals 16.

5. The method of claim 1 wherein selectively seeding the scrambling structure includes generating seed masks in response to a predetermined seed mask selection algorithm.

6. The method of claim 1 further comprising:
transmitting the scrambled communications;
receiving the scrambled communications;
defining a descrambling structure;
selectively seeding the descrambling structure; and
descrambling communications using a descrambling algorithm responsive to the selectively seeded descrambling structure.

7. The method of claim 6 wherein selectively seeding the scrambling structure includes seeding the scrambling structure with a first seed mask; and
wherein selectively seeding the descrambling structure including seeding the descrambling structure with the first seed mask.

8. The method of claim 7 further comprising:
receiving seed mask information in an auxiliary channel; and
selecting seed masks in response to the receiving seed mask information; and
wherein selectively seeding the descrambling structure includes seeding the descrambling structure with the seed masks selected in response to the seed mask information.

9. The method of claim 8 wherein receiving seed mask information in an auxiliary channel includes receiving unscrambled overhead bytes; and
wherein selecting seed masks in response to the receiving seed mask information includes selecting seed masks in response to receiving the unscrambled overhead bytes.

10. The method of claim 9 further comprising:
establishing a seed mask generation key; and
wherein selecting seed masks in response to the receiving seed mask information includes using the unscrambled overhead bytes as a key to generate the seed masks.

11. The method of claim 9 further comprising:
storing seed masks; and
wherein selecting seed masks in response to receiving the unscrambled overhead bytes includes using the unscrambled overhead bytes as a key to retrieve the seed masks.

12. The method of claim 9 wherein receiving seed mask information in an auxiliary channel includes receiving unscrambled frame synchronization bytes.

13. The method of claim 9 wherein the scrambled communications are received through a first data link; and
wherein receiving seed mask information in an auxiliary channel includes receiving seed mask information through a second data link.

14. The method of claim 9 wherein receiving scrambled communications includes receiving scrambled communication superframes; and
wherein selectively seeding the descrambling structure includes selecting a seed mask every superframe.

15. A method for programmably descrambling a multidimensional digital frame structure, the method comprising:
receiving scrambled communications;
wherein receiving scrambled communications includes receiving scrambled communication superframes, with each superframe including frame synchronization bytes;
defining a descrambling structure;
selectively seeding the descrambling structure;
wherein selectively seeding the descrambling structure includes periodically changing the descrambling structure seed mask;
wherein selectively seeding the descrambling structure further includes selecting a seed mask every superframe;
generating a selectable descrambling algorithm responsive to the selective seeding of the descrambling structure; and
descrambling the communications using the selectable descrambling algorithm;
wherein descrambling communications using the selectable descrambling algorithm includes synchronously descrambling the communications in each superframe in response to the superframe frame synchronization bytes.

16. The method of claim 15 further comprising:
receiving seed mask information in an auxiliary channel; and
selecting seed masks in response to the receiving seed mask information; and
wherein selectively seeding the descrambling structure including seeding the descrambling structure with the selected seed masks.

17. The method of claim 16 wherein receiving seed mask information in an auxiliary channel includes receiving unscrambled overhead bytes; and
wherein selecting seed masks in response to the receiving seed mask information includes selecting seed masks in response to receiving the unscrambled overhead bytes.

18. The method of claim 17 further comprising:
establishing a seed mask generation key; and
wherein selecting seed masks in response to the receiving seed mask information includes using the unscrambled overhead bytes as a key to generate the seed masks.

19. The method of claim 17 further comprising:
storing seed masks; and
wherein selecting seed masks in response to receiving the unscrambled overhead bytes includes using the unscrambled overhead bytes as a key to retrieve the seed masks.

20. A system for programmably scrambling a multidimensional digital frame structure, the system comprising:
a transmitter including:
a scrambling algorithm generator having an input to accept a seed mask and an output to supply a scrambling algorithm responsive to the structure of the algorithm generator and the seed mask;
a transmit seed mask generator having a first input to accept seed selection commands and an output connected to the scrambling algorithm generator input to selectively supply seed masks;
a scrambler having a first input to accept communications and a second input connected to the scrambling algorithm generator output, the scrambler having an output to supply communications scrambled with the scrambling algorithm responsive to the selected seed mask.

21. The system of claim 20 wherein the transmit seed mask generator periodically receives commands to change the seed mask.

22. The system of claim 21 wherein the scrambler accepts communications formatted in superframes, with each superframe including a first plurality of frames;
wherein the transmit seed generator selects a seed mask every superframe; and
wherein the scrambling algorithm generator changes the scrambling algorithm every superframe.

23. The system of claim 21 wherein the scrambler accepts communications formatted in superframes, with each superframe including frame synchronization bytes; and wherein the scrambler synchronously scrambles the communications in each superframe in response to the superframe frame synchronization bytes.

24. The system of claim 23 further comprising:

a receiver including:

a descrambling algorithm generator having an input to accept a seed mask and an output to supply a descrambling algorithm responsive to the structure of the algorithm generator and the seed mask;

a receiver seed mask generator having a first input to accept seed selection commands and an output connected to the descrambling algorithm generator input to selectively supply seed masks; and a descrambler having a first input to accept scrambled communications and a second input connected to the descrambling algorithm generator output, the descrambler having an output to supply communications descrambled with the descrambling algorithm responsive to the selected seed mask.

25. The system of claim 24 wherein the transmit seed generator accepts commands to generate a first seed mask;

wherein the scrambling algorithm generator generates a first algorithm in response to receiving the first seed mask;

wherein the scrambler scrambles communications using the first algorithm;

wherein the receiver seed generator accepts commands to generate a first seed mask;

wherein the descrambling algorithm generator generates a first algorithm in response to receiving the first seed mask; and wherein the descrambler descrambles communications using the first algorithm.

26. The system of claim 25 wherein the receiver accepts seed mask information in an auxiliary channel and supplies seed mask commands to the receiver seed mask generator in response to the seed mask information; and wherein the receiver seed mask generator generates a first seed masks in response to the received seed mask information;

wherein the descrambling algorithm generator generates a first algorithm in response to the first seed mask; and wherein the descrambler descrambles the communications in response to the first algorithm.

27. The system of claim 26 wherein the receiver receives seed mask information in an auxiliary channel as unscrambled overhead bytes; and wherein the receiver seed generator generates the first seed mask in response to the receipt of the unscrambled overhead bytes.

28. The system of claim 26 wherein the receiver receives seed mask information in an auxiliary channel as unscrambled overhead bytes; and wherein the receiver seed generator retrieves a seed mask from storage in response to the receipt of the unscrambled overhead bytes.

29. The system of claim 26 wherein the receiver receives seed mask information in an auxiliary channel as unscrambled frame synchronization bytes.

30. The system of claim 26 wherein the receiver accepts scrambled communications through a first data link and the auxiliary channel through a second data link, independent of the first data link.

31. The system of claim 26 wherein descrambler receives scrambled communication formatted into superframes; and wherein the receiver seed generator accepts commands to generate a new seed mask every superframe.

32. A method for communicating among nodes in a network of communication nodes, the method comprising:

sending a descrambling key to selected nodes in the network;

receiving the descrambling key at the selected nodes; and selecting a seed mask in response to the descrambling key;

generating a scrambling algorithm from the first seed mask;

generating a descrambling algorithm from the first seed mask;

scrambling a communication in the network using the scrambling algorithm; and descrambling the communication at the selected nodes using the descrambling algorithm.

* * * * *